US005570264A

United States Patent [19]

Lundquist et al.

[11] Patent Number: 5,570,264

[45] Date of Patent: Oct. 29, 1996

[54] SURGE ARRESTER

[75] Inventors: Jan Lundquist; Lennart Stenström, both of Ludvika, Sweden

[73] Assignee: Asea Brown Boveri AB, Vasteras, Sweden

[21] Appl. No.: 513,963

[22] PCT Filed: Feb. 8, 1994

[86] PCT No.: PCT/SE94/00097

§ 371 Date: Sep. 11, 1995

§ 102(e) Date: Sep. 11, 1995

[87] PCT Pub. No.: WO94/22150

PCT Pub. Date: Sep. 29, 1994

[30] Foreign Application Priority Data

Mar. 16, 1993 [SE] Sweden ........................ 9300857

[51] Int. Cl.[6] ........................ H02H 1/00

[52] U.S. Cl. ........................ 361/127; 361/117; 361/118

[58] Field of Search ........................ 361/117, 118, 361/126, 127

[56] References Cited

U.S. PATENT DOCUMENTS 4,340,924 7/1982 Kresge et al. ........................ 361/127

4,467,387 8/1984 Bergh et al. ........................ 361/127

*Primary Examiner*—Howard L. Williams

*Assistant Examiner*—Sally C. Medley

*Attorney, Agent, or Firm*—Watson Cole Stevens Davis, P.L.L.C.

[57] ABSTRACT

A surge arrester with an elongated polymer housing (1) includes a stack of arrester elements (2), for example of zinc oxide. To limit the radial voltage stress which may arise in the polymer material upon pollution, the polymer housing (1) is provided on the outside with field-equalizing control electrodes (6) in the form of bands or rings of metal at regular distances along the arrester. The control electrodes (6) are electrically connected to the ZnO stack (2, 3) inside the housing (1).

6 Claims, 2 Drawing Sheets

SURGE ARRESTER

BACKGROUND OF THE INVENTION

FIELD OF THE INVENTION

The present invention relates to a surge arrester with an elongated outer housing which consists of an insulator of polymeric material comprising at least one stack of a plurality of cylindrical arrestor elements, preferably made of zinc oxide varistor material, which are arranged one after the other in the axial direction of the arrestor elements between two metal electrodes which are each arranged at a respective end of the polymer insulator.

In connection with pollution, surge arresters are subjected to heavy radial electrical stresses. This is due to the differences between the internal voltage distribution which is controlled by the ZnO blocks and the external voltage distribution which is caused by the pollution. In arresters with polymer insulators, the high electrical stress is applied to the polymer material, with an ensuing risk of degradation of the polymer material. The stress in connection with pollution increases, in principle, with the length of the arrester. One way of reducing the risk of degradation of the polymer is to limit the electrical stress to a certain level, independently of the length of the arrester. This can be done, as is common in arresters with porcelain housings, by constructing the arrester in several mechanically separated parts (multi-part arrester), in which each arrester part comprises an insulating housing provided with metal flanges and comprising a stack of series-connected ZnO blocks. The metal flanges at the joint between adjacent arrester parts thereby form a galvanic connection between the stacks of blocks and the outer surface of the housing. This is, however, a uneconomical solution and, in addition, it makes the arrester unnecessarily long.

SUMMARY OF THE INVENTION

The object of the present invention is to provide a surge arrester with a polymer housing which is intended for high system voltages, in which the possible voltage stress within an arrester part can be limited in an economical way to an acceptable level taking into account the polymer material, while at the same time making possible a minimization of the length of the arrester in relation to the system voltage. This is achieved according to the invention by a surge attester with the field-limiting control electrodes along the length of the polymer insulator outer housing, the control electrodes being electrically connected with the stack of arrestor elements within the housing.

By providing the insulator on the outside with bands or rings of metal at regular mutual distances along the arrester, and electrically connecting these bands to the ZnO stack on the inside, the voltage difference between the bands, and hence the maximum stress on the polymer, will be determined by the number of ZnO blocks between the bands. In this way, an arrester can be constructed as a single-part arrester, even for high voltages.

If, in addition, the field-equalizing bands or rings are made mechanically strong, an additional advantage is obtained, namely, in connection with an internal short circuit in the arrester. An arrester with a polymer insulator may be provided with an inner glass-fibre reinforced tube or a winding to obtain mechanical strength. If, for example, in connection with a fault in an arrester element, a short-circuit arc is formed inside the arrester with an ensuing overpressure, such a tube will normally crack up. The cracking may, however, become too great, especially if the arrester is long, which may result in parts of the ZnO blocks being thrown out. By providing the arrester with strong bands or rings according to the above, the advantage can be achieved that the tube cracks in a more controlled manner.

The connection between the control electrode and the stack of arrester elements is suitably achieved with the aid of a contact pin which extends through a radial hole in the polymer insulator and which is pressed, by a spring arranged in a recess in the control electrode, against a cylindrical spacer of metal arranged in the element stack. In such a design, the contact pin may slide against the spacer and maintain a good contact connection even in case of relative movements between the element stack and the polymer housing, which may arise, for example, in case of bending stress on the arrester.

The invention will be explained in greater detail by describing an embodiment with reference to the accompanying drawings.

DETAILED DESCRIPTION OF THE PREFERRED EMBODIMENT

Figure 1:
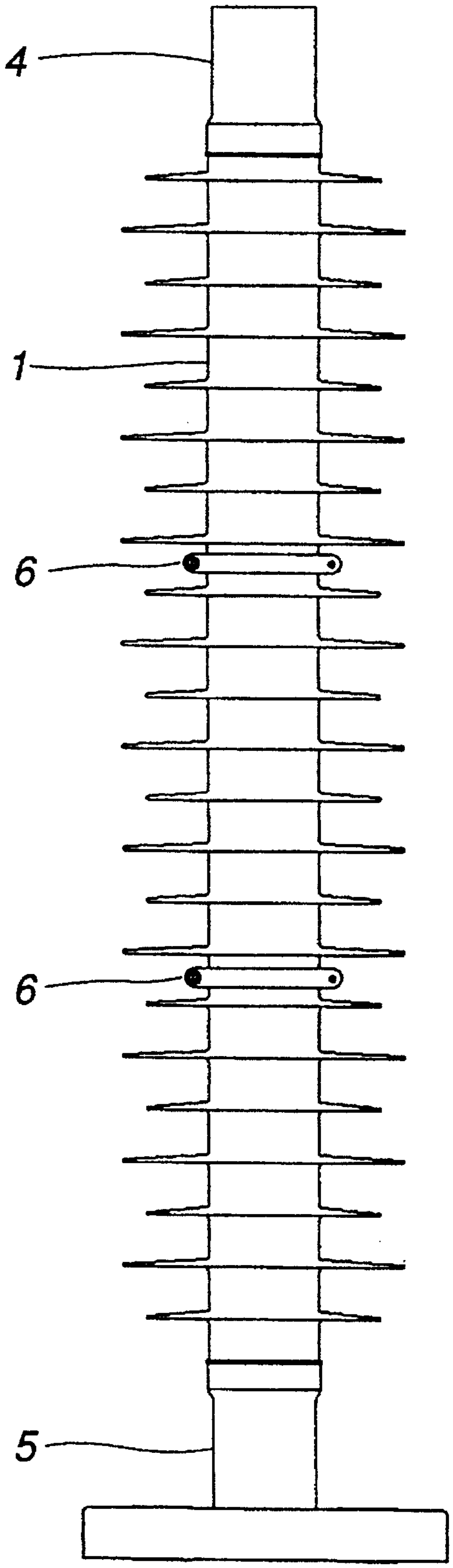
FIG. 1 is an axial view of a surge arrester according to the invention.
Figure 2:
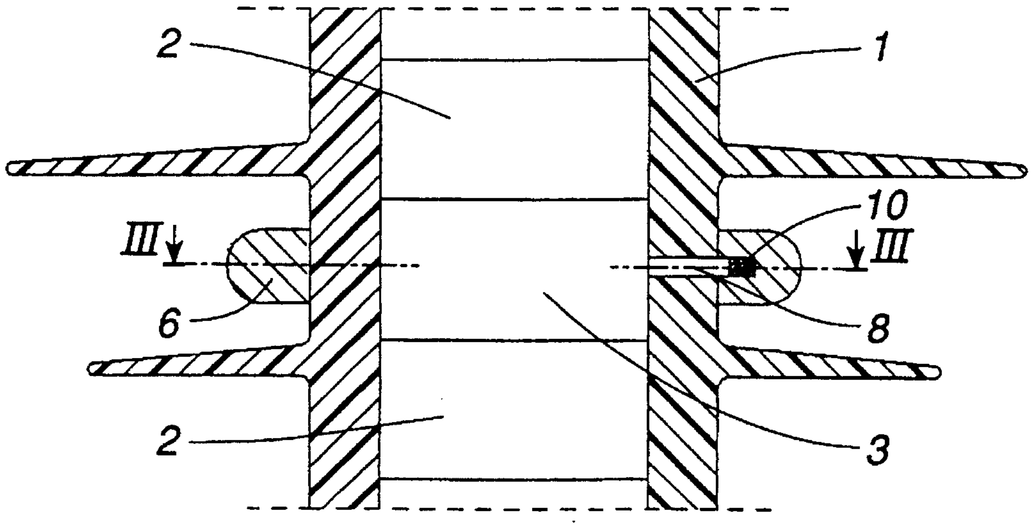
FIG. 2 is an axial section through part of the surge arrester according to FIG. 1.
Figure 3:
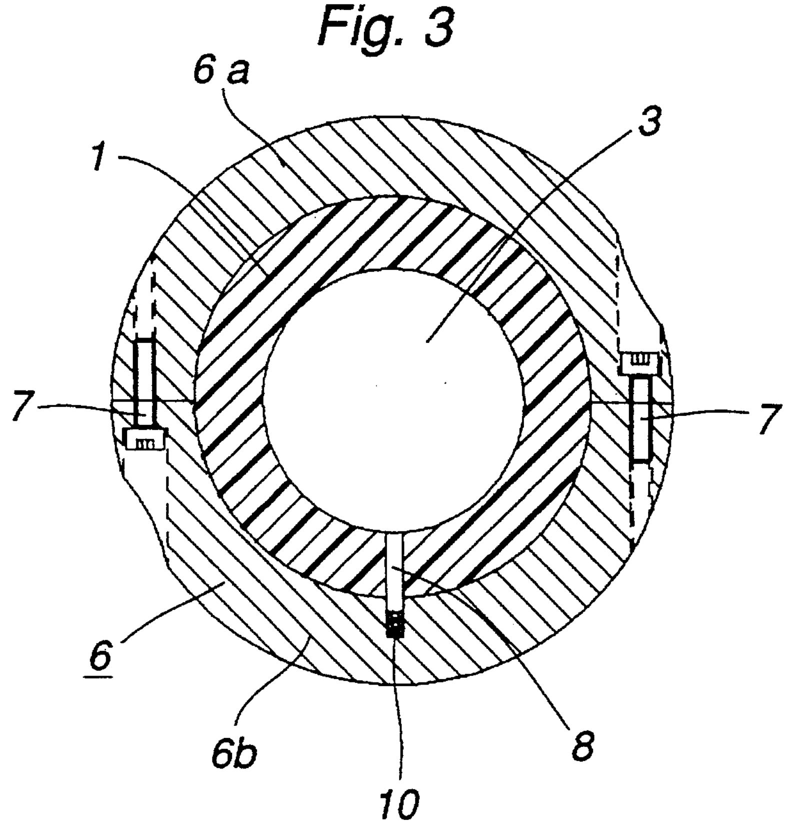
FIG. 3 is a cross section through the surge arrester along the line III—III in FIG. 2.

The surge arrester shown in the drawings has an elongated outer housing 1 consisting of an insulator of polymeric material. The polymer insulator 1 comprises a stack of arrester elements 2 (FIG. 2) in the form of circular-cylindrical blocks of zinc oxide with heat-absorbing spacers 3 in the form of circular-cylindrical metal blocks. At each end of the stack an end electrode 4 and 5, respectively, of metal is arranged (FIG. 1).

On its outside, the polymer insulator 1 is provided with two field-equalizing control electrodes 6 in the form of rings of metal arranged at regular distances along the arrester. The rings are made in two halves *6a* and *6b*, which are joined by means of screws 7 and clamped against the surface of the insulator.

Each control electrode 6 is electrically connected to a metal block 3 in the stack of arrester elements, the metal block 3 being arranged radially inside the electrode. The connection is brought about through a contact pin 8 which extends through a radially-directed hole in the polymer insulator 1. A spring 10, which is arranged in a recess in the electrode 6, presses the contact pin 8 against the envelope surface of the metal block 3. This results in a stable and at the same time flexible contact connection, since the tip of the contact pin may slide against the surface of the metal block in case of any relative movements, caused, for example, by mechanical or thermal influence, between the element stack and the housing.

The invention is not limited to the embodiment shown but several modifications are possible within the scope of the invention. For example, the control electrodes may consist of metal bands stretched around the polymer insulator, and between the element stack and the polymer insulator a glass-fibre reinforced plastic tube may possibly be arranged to mechanically stiffen the arrester.

We claim:

1. A surge arrester comprising:

an elongated outer housing consisting of an insulator of polymeric material;

two metal electrodes affixed to the ends of said insulator;

at least one stack of a plurality of cylindrical arrester elements of metal oxide varistor material disposed within said insulator, said arrester elements being arranged one after the other in their axial direction between the ends of said insulator for providing permanent electrical connection between said end electrodes;

at least one field-limiting control electrode fixed around the insulator at a location intermediate said end electrodes; and connecting means extending transversely to the stack of arrester elements for electrically connecting said control electrode with said stack to limit radial voltage stress in the polymeric material.

2. A surge arrester according to claim 7, wherein the control electrode consists of a metal band.

3. A surge arrester according to claim 7, wherein the control electrode consists of a divided ring of metal which is clamped to the insulator.

4. A surge arrester according to claim 7, wherein the stack of elements comprises at least one heat-absorbing cylindrical spacer of metal which is arranged radially inside the control electrode, and the control electrode is electrically connected to the spacer via a connecting conductor extending through a radial hole in the insulator.

5. A surge arrester according to claim 4, wherein the connecting conductor consists of a contact pin which is pressed by a spring arranged in a recess in the control electrode against the spacer.

6. A surge arrester according to claim 7, comprising a plurality of said field-limiting control electrodes arranged at regular mutual distances along the arrester.

* * * * *